United States Patent
Landskron et al.

(10) Patent No.: US 9,358,902 B2
(45) Date of Patent: Jun. 7, 2016

(54) HOLDING DEVICE FOR AN ADJUSTMENT DRIVE OF A MOTOR VEHICLE SEAT

(75) Inventors: Robert Landskron, Monheim (DE); Thorsten Schürmann, Odenthal (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 0 days.

(21) Appl. No.: 14/233,618

(22) PCT Filed: Jul. 5, 2012

(86) PCT No.: PCT/EP2012/063152
§ 371 (c)(1),
(2), (4) Date: May 23, 2014

(87) PCT Pub. No.: WO2013/010809
PCT Pub. Date: Jan. 24, 2013

(65) Prior Publication Data
US 2014/0246559 A1 Sep. 4, 2014

(30) Foreign Application Priority Data
Jul. 21, 2011 (DE) .......................... 10 2011 052 045

(51) Int. Cl.
*B60N 2/06* (2006.01)
*F16C 1/06* (2006.01)
(Continued)

(52) U.S. Cl.
CPC .............. *B60N 2/067* (2013.01); *B60N 2/0232* (2013.01); *F16C 1/26* (2013.01); *B60N 2002/024* (2013.01); *F16C 2326/08* (2013.01)

(58) Field of Classification Search
CPC ........ B60N 2/0232; B60N 2/067; B60N 2/07; B60N 2/0701; B60N 2/0705; B60N 2/0712; B60N 2/072; B60N 2002/0236; B60N 2002/024; F16C 1/06; F16C 2326/08; F16C 1/26
USPC .................. 248/424, 429; 297/344.1, 344.11; 296/65.01

See application file for complete search history.

(56) References Cited

U.S. PATENT DOCUMENTS 6,322,146 B1 * 11/2001 Fisher, Jr. ................ 297/362.14
2004/0009819 A1 1/2004 Koga
(Continued)

FOREIGN PATENT DOCUMENTS

| CN | 101939189 A | 1/2011 |
| DE | 29 25 781 A1 | 1/1981 |

(Continued)

OTHER PUBLICATIONS

International Preliminary Report on Patentability received in PCT/EP2012/063152, Jan. 21, 2014.
(Continued)

*Primary Examiner* — Michael Safavi
(74) *Attorney, Agent, or Firm* — Foley & Lardner LLP

(57) ABSTRACT

A holding device for an adjustment drive of a motor vehicle seat has at least one channel for receiving a drive shaft which is mounted rotatably in a shaft casing and is connectable at one end to a drive unit and at the other end to an adjustment device. In order to provide such a holding device that permits a reliable arrangement of the shaft casing, in particular in a manner secure against rotation, provision is made for the channel to be formed for positioning the shaft casing in a manner partially offset in relation to the longitudinal axis of the channel.

13 Claims, 3 Drawing Sheets

Figure 1:
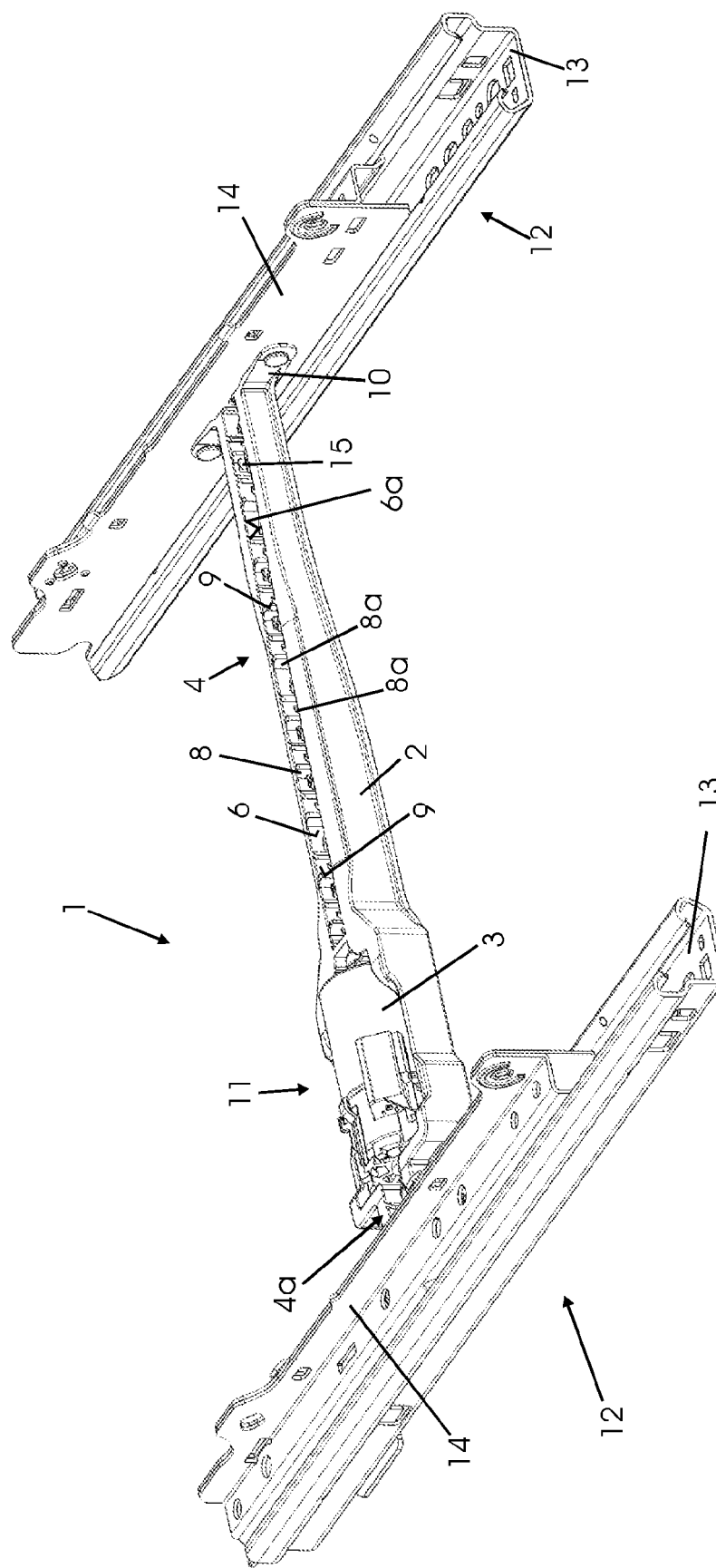

(51) Int. Cl.
*F16C 1/26* (2006.01)
*B60N 2/02* (2006.01)

(56) References Cited

U.S. PATENT DOCUMENTS

| | | |
|---|---|---|
| 2005/0173960 A1 | 8/2005 | Tores |
| 2008/0309137 A1 | 12/2008 | Kostin |
| 2009/0102262 A1 | 4/2009 | Tores |
| 2010/0264288 A1 | 10/2010 | Thuleau et al. |
| 2010/0320352 A1* | 12/2010 | Weber ........................ 248/429 |
| 2011/0139954 A1* | 6/2011 | Ruess et al. ................. 248/429 |

FOREIGN PATENT DOCUMENTS

| | | |
|---|---|---|
| DE | 689 13 632 T2 | 6/1994 |
| DE | 693 23 785 T2 | 11/1999 |
| DE | 603 16 483 T2 | 7/2008 |
| DE | 10 2007 027 322 A1 | 12/2008 |
| DE | 10 2009 004 365 A1 | 7/2009 |
| EP | 2 003 011 A2 | 12/2008 |
| FR | 2 883 810 A1 | 10/2006 |
| FR | 2 924 646 A1 | 6/2009 |
| JP | H10-147164 A | 6/1998 |
| JP | 2000-052822 A | 2/2000 |
| WO | WO-86/00678 A1 | 1/1986 |
| WO | WO-99/51456 A1 | 10/1999 |

OTHER PUBLICATIONS

International Search Report mailed Oct. 15, 2012, as received in corresponding International Patent Application No. PCT/EP2012/063152.

* cited by examiner

HOLDING DEVICE FOR AN ADJUSTMENT DRIVE OF A MOTOR VEHICLE SEAT

CROSS REFERENCE TO RELATED APPLICATIONS

The present application is a U.S. National Stage of International Application No. PCT/EP2012/063152, filed Jul. 5, 2012, which claims the benefit of German Patent Application No. 10 2011 052 045.7, filed Jul. 21, 2011, the entire disclosures of all of which are incorporated herein by reference.

The invention relates to a holding device for an adjustment device for a motor vehicle seat, with
  at least one channel for receiving a drive shaft which is mounted rotatably in a shaft casing and is connectable at one end to a drive unit and at the other end to an adjustment device.

Holding devices of the initially-cited type are used on motor vehicle seats in order to arrange the drive shafts connected to drive units, generally electric motors, on the motor vehicle seat where the drive shafts are connected to an adjustment device for the motor vehicle seat by means of which the motor vehicle seat can be adjusted to the user's requirements. Typical adjustment drives are e.g. seat backrest adjusters, seat inclination adjusters or a longitudinal seat adjusting device, wherein the vehicle seat can be positioned by means of the latter relative to the vehicle floor in the longitudinal direction of the vehicle.

In order to connect the drive unit, normally an electric motor, to the adjustment device, drive shafts, in particular when they are flexibly designed, are particularly suitable since they can be used to effectively bridge the distance between the electric motor and the adjustment device. To protect the drive shaft from damage that it may experience for example in a drive for a longitudinal seat adjustment when a hindrance is disposed within the range of adjustment of the drive shaft, the known holding devices of the initially-cited type have at least one channel in which is held the drive shaft borne rotatably in a shaft casing. The dimensions of the shaft casing and the channel cross-section are harmonized with each other in order to achieve a largely play-free arrangement of the shaft casing. The holding device protects the drive shaft from damage and thereby ensures essentially trouble-free operation, wherein the drive shaft is protected by the shaft casing which coaxially surrounds it from outside influences.

It has, however, been revealed that the generic holding devices have the disadvantage that the shaft casings, which are generally held in the channel in an interference and/or form fit, tend to rotate conjointly when the drive shaft is driven which generates unpleasant noise when the drive unit is actuated. In addition, the danger exists of the shaft casing leaving the channel into an unprotected position due to its movement.

Against this background, the object of the invention is to provide a holding device of the initially-cited type which allows a reliable arrangement of the shaft casing, in particular in a manner secure against rotation.

The object of the invention is achieved by a holding device having the features of claim 1. Advantageous further developments of the invention are specified in the dependent claims.

It is characteristic of the holding device according to the invention for the channel to be formed for positioning the shaft casing in a manner partially offset in relation to the longitudinal axis of the channel.

The invention assumes that the shaft casing and the channel provided for accommodation are harmonized with each other so that as is the case with holding devices known from the prior art the shaft casing is held in the installation position in the channel of the holding device, at least in sections, in at least an interference fit between the channel side walls of the channel. This results in a harmonization between the channel width and the inserted shaft casing.

The holding device according to the invention differs from the holding devices known from the prior art in that the channel is designed such that, when viewed in the direction of the longitudinal axis of the channel, the shaft casing does not extend substantially straight over the entire channel length but rather has a shape which causes the position of the shaft casing to be partially offset in relation to the longitudinal axis, or mid-axis, of the channel. Given the offset position, the shaft casing in this region is kinked and/or bent relative to the longitudinal axis of the channel which reliably prevents it from conjointly rotating when the drive shaft is driven. The longitudinal axis of the channel is offset, or the shaft casing is bent or kinked, such that the drive shaft remains rotatable relative to the shaft casing. Consequently, due to the offset arrangement, the embodiment of the holding device according to the invention reliably prevents the shaft casing from conjointly rotating and simultaneously possesses a high degree of functional reliability.

The specific embodiment of the channel for a sectionally offset position in relation to the longitudinal axis of the channel, i.e., regionally kinked or bent arrangement of the shaft casing, is freely selectable in principle. According to one particularly advantageous embodiment of the invention, provision is made for the channel to have at least two projections of a different length that project from a first channel side wall and are spaced from each other in the direction of the longitudinal axis of the channel, wherein at least two projections that are correspondingly arranged on an opposite channel side wall are designed such that the spacing of the opposing projections remains constant.

According to this further embodiment of the invention, provision is made for the spacing to remain constant of the projections that are arranged assigned to each other on opposing side walls and determine the contour of the shaft casing in this region. Since, in addition, two neighboring projections of a channel side wall—viewed in the direction of the longitudinal axis of the channel—have a different length, i.e. project to a different extent from the channel side wall into the channel, a shaft casing in the installed position with an outer diameter that substantially corresponds to the spacing of the projections is arranged offset relative to the longitudinal channel axis in the region of these projections since the shaft casing is bent or kinked relative to the longitudinal channel axis corresponding to the position of the projections.

The embodiment of the channel with the projections projecting from the channel side walls constitutes a particularly simple embodiment that makes it possible to position the shaft casing offset in sections in the direction of the longitudinal channel axis. The advantageous development therefore makes it possible to particularly easily and economically manufacture a holding device with an arrangement of the shaft casing in the channel of the holding device fixed against rotation.

At the same time, an arrangement of the shaft casing secured against rotation is already achieved in principle by a holding device having a shaft casing position that is offset only in one region of the channel. One particularly advantageous embodiment of the invention provides, however, that the channel is designed to position the shaft casing offset in a wavy manner relative to the longitudinal axis of the channel. According to this embodiment of the invention, it is provided that the channel or the channel side walls are configured such that the shaft casing, when in its installed position within the channel, does not extend in a straight line along the longitudinal channel axis but rather has a wavy contour relative to the direction of the longitudinal axis of the channel. That is, a midline of the shaft casing intersects with the longitudinal channel axis at points arranged at a distance from each other, wherein the shaft casing, when in the installed position, preferably has a regular wavy contour.

The embodiment of the channel for wavy positioning can be freely selected in principle. This can hence be achieved for example by means of a channel with side walls that have a constant spacing aligned with the outer diameter of the shaft casing, yet at the same time run in a wavy manner and not in a straight line viewed in the direction of the longitudinal channel axis. One particularly advantageous embodiment of the invention provides that the projections are designed to position the shaft casing offset in a wavy manner relative to the longitudinal axis of the channel. Accordingly, the projections arranged adjacent to each other viewed in the direction of the longitudinal channel axis have different lengths at fixed intervals. According to one possible embodiment of this development, it can be provided for example that, when viewed in the longitudinal direction of the channel axis, sequentially alternating projections are arranged with a first and second length, and corresponding projections with the different length are arranged on the opposite channel side wall so that the spacing remains constant between the projections. The shaft casing with an outer diameter that is adapted to the spacing of the projections then has a wavy contour in the installed position. This embodiment of the invention can be manufactured very easily and economically, and furthermore ensures in a particularly reliable manner that the shaft casing is secured against rotation relative to the channel.

The embodiment of the projections is also freely selectable in principle. However, it is provided according to one particularly advantageous embodiment of the invention that the projections are formed by bars that project from the channel side walls at a distance from each other, wherein at least two bars arranged adjacent to each other on a channel side wall have a different length, and wherein the bars arranged on the opposite channel side wall are configured so that the distance between the opposing bars remain constant.

As already mentioned above, an embodiment of the channel that leads to a shaft casing position which is only offset in one section is sufficient for an arrangement of the shaft casing that is secure against rotation. According to one particularly advantageous embodiment of the invention in which projections designed as bars are used, the bar ends that lie against the shaft casing have a profile, in particular a toothed profile. A corresponding embodiment of the bar ends that come in contact with the shaft casing additionally secures the position of the shaft casing in the installed position and, in a particularly reliable manner, prevents the shaft casing from rotating when the drive shaft shifts. In particular, a reliable securing of the position is achieved by this embodiment of the bar ends, even when the position of the shaft casing is only slightly offset in a section.

The formation of the bar ends with a concave or convex contour provided according to another embodiment of the invention, and/or with bars that are arranged substantially parallel to the longitudinal channel axis, additionally secures the position of the shaft casing. By aligning the bar ends substantially parallel to the longitudinal channel axis, the edges adjacent to the bar ends also penetrate the largely flexible shaft casing due to the sectionally curved or bent installation position of the shaft casing, whereby additional securing of the position, in particular in an axial direction, can be achieved. According to one advantageous development of the invention, influence on the shaft casing can also be improved by angling the bars relative to the longitudinal channel axis, whereby the edges between the bar ends and the side surface of the bars form a sharp angle which is particularly suitable for penetrating the shaft casing like a blade.

The design of the channel base can, in principle, be selected freely. One particularly advantageous embodiment of the invention, however, provides that the channel base has a concave or convex shape which achieves a particularly effective securing of the position of the shaft casing in the channel.

By correspondingly harmonizing the outer diameter of the shaft casing and channel width, an installation position of the shaft casing can, in principle, already be established in which the shaft casing is reliably held in an interference fit and/or form fit. One particularly advantageous embodiment also provides holding lugs that project towards a channel opening opposite the channel base. The holding lugs with free ends which advantageously have a detent lug that projects toward the longitudinal channel axis strongly secure the position of the shaft casing in the direction of the channel opening. In a particularly effective manner, this prevents the shaft casing from sliding out of the channel, and the elastically designed holding lugs make it easy to install the shaft casing.

As already mentioned at the onset, the embodiment of the holding device is freely selectable in principle. The materials which can be used to produce the holding device are also freely selectable with reference to considerations of strength and cost. One particularly advantageous embodiment of the invention, however, provides forming them as a single piece from a fiber-reinforced, in particular fiberglass-reinforced or carbon fiber-reinforced plastic. This embodiment of the invention enables particularly easy and economical production of a particularly stable holding device that can be reliably used to arrange the shaft casing.

The drive unit driving the drive shaft can, in principle, be arranged at any desired location, providing that a reliable coupling to the drive shaft is possible. Accordingly, the holding device can also be designed with a connecting section in which the drive unit is connectable to the drive shaft. According to one particularly advantageous embodiment of the invention, provision is made for the holding device to have a receiving section for arranging the drive unit, in particular an electric motor. This embodiment enables the position of the drive unit to be secured especially well, as well as its connection to the drive shaft.

Figure 2:
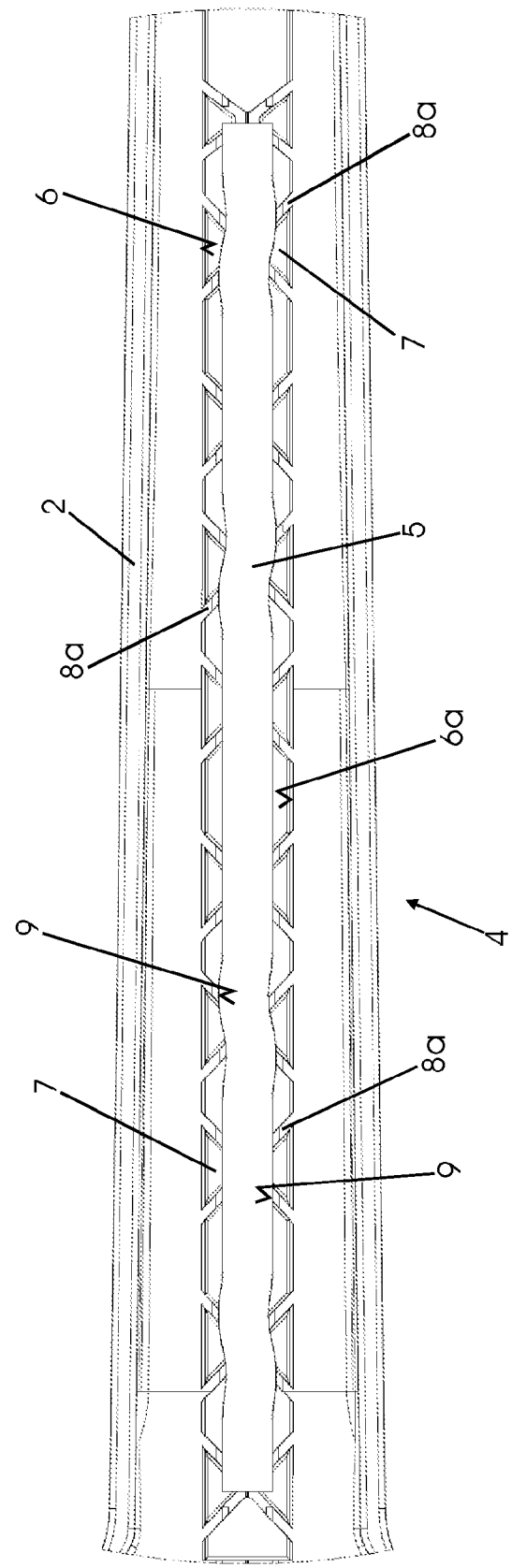

An exemplary embodiment of the invention is explained in the following in more detail with reference to the drawings. The drawings show:

FIG. 1 a perspective view of an adjustment drive with a holding device that is arranged on opposite ends on a seat top rail each;

FIG. 2 a plan view of a channel of the holding device from FIG. 1, and

Figure 3:
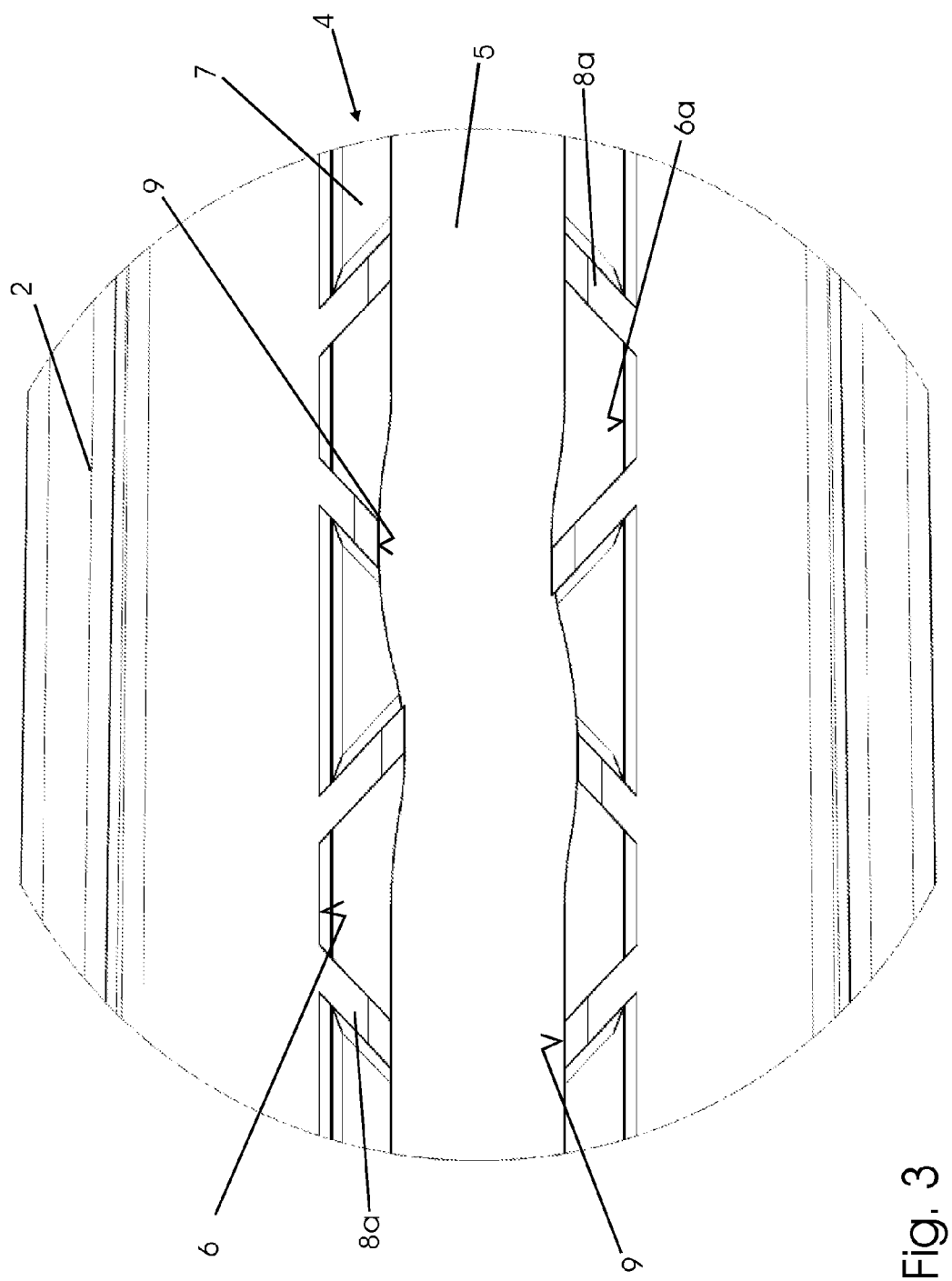

FIG. 3 an enlarged view of a section of the channel from FIG. 2.

FIG. 1 shows a perspective view of an adjustment drive 1 for a longitudinal seat adjustment. To set the longitudinal position of a vehicle seat (not shown), the adjustment drive 1 has a drive unit designed as an electric motor 3 that is arranged in a receiving section 11 of a holding device 2. The holding device 2 extends between the seat rails 12 and is fastened to the opposing seat top rails 14 by means of its connection flanges 10 at the end. The connection flanges 10 are arranged on the ends of two channels 4, 4a opposite the electric motor 3. To adjust the seat top rail 14 relative to a seat bottom rail 13 of the motor vehicle seat rail 12, adjustment devices (not shown here) are provided within the motor vehicle seat rails 12. The adjustment devices are coupled to the drive unit 3 by means of flexible drive shafts. The drive shafts are rotatably mounted in shaft casings 5 that are arranged in the channels 4, 4a to secure the position on the holding device 2.

To secure the position of the shaft casings 5 in the channels 4, 4a, they have bars 8, 8a running at an angle to the channel side walls 6, 6a of the channels and arranged at a distance from each other viewed in the direction of the longitudinal channel axis, and the spacing of the bars 8, 8a, which are arranged opposite each other on the channel side walls 6, 6a, is constant. Viewed in the direction of the longitudinal channel axis, the bars 8, 8a arranged adjacent to each other on a channel side wall 6, 6a extend into the channel 4 at differing lengths. In the region of these bars 8, 8a, the shaft casing 5 has a shape which is kinked or bent relative to the longitudinal channel axis such that the shaft casing 5 is arranged offset from the longitudinal channel axis. This offset mounting of the shaft casing 5 ensures that the shaft casing 5 is particularly secure against rotation when the drive shaft, which is rotatably arranged in the shaft casing 5, rotates.

Given the angled alignment of the bars 8, 8a relative to the channel side walls 6, 6a, the bar ends 9 running substantially parallel to the longitudinal channel axis form a sharp angle with the side surfaces connecting to the bar ends 9 that, as shown in FIGS. 2 and 3, allows the bar edges to penetrate the generally flexible shaft casing 5, which additionally secures the shaft casing 5 against an axial displacement as well as rotation relative to the channel 4.

To additionally secure the position of the shaft casing 5 in the channel 4, the holding device 2 furthermore has elastically mounted holding lugs 15 which project from a channel base 7 toward the channel opening and grip behind the shaft casing 5 with detent lugs when the shaft casing 5 is in the installed position so that shaft casing 5 is reliably arranged in the channel 4.

Overall, the adjustment drive 1 with the holding device 2 reliably arranged on the seat top rails 14 by means of the connection flanges 10 on the end offers highly secure operation without disturbing noise developing during operation from a rotation of the shaft casing within the channel 4.

The invention claimed is:

1. A holding device for an adjustment drive of a motor vehicle seat, comprising:
    at least one channel for receiving a drive shaft which is mounted rotatably in a shaft casing and is connectable at one end to a drive unit,
    wherein the channel is formed for positioning the shaft casing in a manner partially offset in relation to the longitudinal axis of the channel such that the shaft casing is bent or kinked,
    wherein the channel has at least two projections of a different length that project from a first channel side wall and are spaced from each other in the direction of the longitudinal axis of the channel, wherein at least two projections that are correspondingly arranged on an opposite channel side wall are designed such that the spacing of the opposing projections is constant.

2. The holding device according to claim 1, wherein the channel is designed to position the shaft casing offset in a wavy manner relative to the longitudinal axis of the channel.

3. The holding device according to claim 1, wherein the projections are designed to position the shaft casing offset in a wavy manner relative to the longitudinal axis of the channel.

4. The holding device according to claim 1, wherein the projections are formed by bars that project from the channel side walls at a distance from each other, wherein at least two bars arranged adjacent to each other on a channel side wall have a different length, and wherein the bars arranged on the opposite channel side wall are configured so that the distance between the opposing bar ends is constant.

5. The holding device according to claim 1, wherein the channel has at least two projections that are formed by bars, wherein the bars have bar ends that have toothed profiles.

6. The holding device according to claim 5, wherein the bar ends have a concave or convex contour and/or are aligned substantially parallel to the longitudinal axis of the channel.

7. The holding device according to claim 1, wherein the channel comprises a channel base having a concave or convex shape.

8. The holding device according to claim 1, wherein the holding device is formed as a single piece from a fiber-reinforced plastic.

9. The holding device according to claim 7, comprising elastic holding lugs that project towards a channel opening opposite the channel base.

10. The holding device according to claim 9, wherein the holding lugs have detent lugs that project in the direction of the longitudinal axis of the channel.

11. The holding device according to claim 4, wherein the bars are angled relative to the longitudinal axis of the channel.

12. The holding device according to claim 1, comprising a receiving section for arranging a drive unit.

13. A holding device for an adjustment drive of a motor vehicle seat, comprising:
    at least one channel for receiving a drive shaft which is mounted rotatably in a shaft casing and is connectable at one end to a drive unit,
    wherein the channel is formed for positioning the shaft casing in a manner partially offset in relation to the longitudinal axis of the channel,
    wherein the channel has at least two projections of a different length that project from a first channel side wall and are spaced from each other in the direction of the longitudinal axis of the channel, wherein at least two projections that are correspondingly arranged on an opposite channel side wall are designed such that the spacing of the opposing projections is constant.

\* \* \* \* \*